United States Patent
Yoshino et al.

(10) Patent No.: US 7,868,509 B2
(45) Date of Patent: Jan. 11, 2011

(54) SINGLE-PHASE MOTOR AND HERMETIC COMPRESSOR

(75) Inventors: Hayato Yoshino, Tokyo (JP); Yoshio Takita, Tokyo (JP); Koji Yabe, Tokyo (JP); Osamu Kazama, Tokyo (JP)

(73) Assignee: Mitsubishi Electric Corporation, Chiyoda-Ku, Tokyo (JP)

( * ) Notice: Subject to any disclaimer, the term of this patent is extended or adjusted under 35 U.S.C. 154(b) by 0 days.

(21) Appl. No.: 10/593,978

(22) PCT Filed: Dec. 9, 2005

(86) PCT No.: PCT/JP2005/022684
§ 371 (c)(1),
(2), (4) Date: Sep. 22, 2006

(87) PCT Pub. No.: WO2006/098065
PCT Pub. Date: Sep. 21, 2006

(65) Prior Publication Data
US 2007/0210668 A1 Sep. 13, 2007

(30) Foreign Application Priority Data
Feb. 22, 2005 (JP) ................. 2005-045019

(51) Int. Cl.
*H02K 21/12* (2006.01)
(52) U.S. Cl. .................. 310/216.055; 310/216.131
(58) Field of Classification Search ......... 310/216–218, 310/216.049, 216.055, 131–133, 216.131, 310/216.132, 216.133, 216.106
See application file for complete search history.

(56) References Cited

U.S. PATENT DOCUMENTS 3,622,823 A * 11/1971 Broadway et al. ........... 310/254

(Continued)

FOREIGN PATENT DOCUMENTS

JP 61-443 1/1986

(Continued)

OTHER PUBLICATIONS

English translation of JP 11125183 A.*

(Continued)

*Primary Examiner*—Quyen Leung
*Assistant Examiner*—Naishadh N Desai
(74) *Attorney, Agent, or Firm*—Buchanan Ingersoll & Rooney PC

(57) ABSTRACT

It is an object to obtain a highly efficient and low-cost single-phase motor and a hermetic compressor employing the motor by producing the motor in a form that allows a proper material layout, with securing a magnetic path of a coreback of a stator iron core. According to the present invention, in a single-phase motor having a stator including a stator iron core formed by laminating a plurality of electromagnetic steel sheets and provided with a slot and single-phase two-pole distributed windings composed of a main winding and an auxiliary winding contained in the slot, and a rotor placed through a gap on an inner circumference of the stator, at least five notches each having a roughly straight lined shape are provided on an outer circumference of the stator iron core, so that a quadrangle is formed by straight lines including four notches out of the at least five notches.

7 Claims, 11 Drawing Sheets

12 : STATOR TOOTH

U.S. PATENT DOCUMENTS

| | | | | |
|---|---|---|---|---|
| 3,783,318 A | * | 1/1974 | Widstrand | 310/216 |
| 3,942,055 A | * | 3/1976 | Hoffmeyer | 310/216 |
| 4,322,665 A | * | 3/1982 | Landgraf | 318/774 |
| 5,315,198 A | * | 5/1994 | Toroh | 310/162 |
| 5,796,190 A | * | 8/1998 | Takeda et al. | 310/58 |
| 6,020,667 A | * | 2/2000 | Carey et al. | 310/216 |
| 6,023,119 A | | 2/2000 | Asao | |
| 6,046,568 A | * | 4/2000 | Pengov | 318/701 |
| 6,218,753 B1 | * | 4/2001 | Asano et al. | 310/156.53 |
| 6,362,544 B2 | * | 3/2002 | Johnston et al. | 310/44 |
| 6,582,207 B2 | * | 6/2003 | Matsumoto et al. | 417/410.1 |
| 6,858,964 B2 | * | 2/2005 | Masumoto et al. | 310/216 |

FOREIGN PATENT DOCUMENTS

| | | | |
|---|---|---|---|
| JP | 02-223358 A | | 9/1990 |
| JP | 07-031086 A | | 1/1995 |
| JP | 11-125183 A | | 5/1999 |
| JP | 11125183 A | * | 5/1999 |
| JP | 11-252841 A | | 9/1999 |
| JP | 2000-134887 A | | 5/2000 |
| JP | 2000-350390 A | | 12/2000 |
| JP | 2001-268824 A | | 9/2001 |
| JP | 2002-223540 A | | 8/2002 |
| JP | 2002-223540 A | | 8/2002 |
| JP | 2002-247816 A | | 8/2002 |
| JP | 2004-141000 A | | 5/2004 |
| JP | 2004-173366 A | | 6/2004 |
| JP | 2004-364444 A | | 12/2004 |
| JP | 2005-6416 A | | 1/2005 |

OTHER PUBLICATIONS

International Search Report issued in PCT/JP2005/022684 on Mar. 14, 2006 by the Japanese Patent Office(in English).

Korean Decision to Refuse for Application No. 10-2006-7020563 and its English translation.

First Office Action issued by the Chinese Patent Office in priority Chinese Application No. 200580012405.6 issued on Sep. 5, 2008; and partial English translation thereof.

Japanese Patent Office Action issued Nov. 17, 2009, and partial translation thereof.

Translation of the "Summary of the Invention" of JP 61-443.

Machine translation of JP 2004-141000, produced Jan. 30, 2010 from the Japanese Patent Office website.

Machine translation of JP 11-125183, produced Jan. 30, 2010 from the Japanese Patent Office website.

Machine translation of JP 2005-006416, produced Jan. 30, 2010 from the Japanese Patent Office website.

Japanese Language and English Language translation of Office Action issued in Japanese Application No. 2005-045019 on Apr. 6, 2010.

* cited by examiner

1 : STATOR IRON CORE
2 : NOTCH
3 : SMALL SLOT
4 : LARGE SLOT
5 : COREBACK

6 : HOOP MATERIAL

31 : SMALL SLOT

7 : ROTOR IRON CORE
8 : ROTOR SLOT

7 : ROTOR IRON CORE
8 : ROTOR SLOT
9 : ROTOR SLIT

13 : RARE EARTH MAGNET

12 : STATOR TOOTH

12 : STATOR TOOTH

SINGLE-PHASE MOTOR AND HERMETIC COMPRESSOR

TECHNICAL FIELD

The present invention relates to a single-phase motor having single-phase two-pole windings and a hermetic compressor employing the single-phase motor.

BACKGROUND ART

As for a conventional single-phase motor, a size of a slot in which an auxiliary winding is contained is reduced, and an outer circumference of a stator iron core is formed into a polygonal shape. Further, with securing magnetic path of a coreback, a width of hoop material of electromagnetic steel sheets is reduced (refer to Patent Document 1, for example).

Further, another conventional single-phase motor has a notch having a roughly semicircular shape on an outer circumference of a stator, so that noise reduction is carried out without interrupting a main magnetic path of a stator iron core (refer to Patent Document 2, for example).
Patent Document 1: JP11-252841
Patent Document 2: JP2001-268824

DISCLOSURE OF THE INVENTION

Problems to be Solved by the Invention

In a conventional single-phase motor, since an outer circumference of an iron core is formed into a hexagon, a width of hoop material can be reduced; however, a material layout may deteriorate since each pitch is determined at a vertex of the hexagon. This causes a problem that the cost is increased.

Further, there is another problem that in another conventional single-phase motor, since a notch is large, a main magnetic path of a coreback of a stator iron core may deteriorate when it is used for a two-pole single-phase motor.

The present invention is provided to solve the above problems and aims to obtain a highly efficient and low cost single-phase motor and a hermetic compressor employing the motor by producing the motor in a form that allows a proper material layout, with securing a magnetic path of a coreback of a stator iron core.

Further, the present invention aims to obtain, by inserting a main winding into a large slot so as to increase a maximum torque of a motor, a highly reliable single-phase motor which can generate torque sufficient to operate the motor even if the applied voltage is decreased and a hermetic compressor employing the motor.

Means to Solve the Problems

According to the present invention, in a single-phase motor having: a stator including a stator iron core formed by laminating a plurality of electromagnetic steel sheets and provided with a slot and single-phase two-pole distributed windings composed of a main winding and an auxiliary winding contained in the slot; and a rotor placed through a gap on an inner circumference of the stator, at least five notches each having a roughly straight lined shape are provided on an outer circumference of the stator iron core, so that a quadrangle is formed by straight lines including four notches out of the at least five notches.

Further, the single-phase motor of the invention includes six notches, so that a rectangle or a square is formed by straight lines including four notches out of the six notches.

Moreover, in the single-phase motor of the invention, the stator iron core is provided with a plurality of slots, among a plurality of slots, at an outer circumferential side of which a notch is not placed, at least one slot is made to have a deeper depth in a radial direction than a slot, at an outer circumferential side of which a notch is placed, so that a large slot and a small slot are formed.

Yet further, in the single-phase motor of the invention, winding to be contained in the large slot has a higher cross section ratio of winding for a slot area than winding to be contained in the small slot.

Further, in the single-phase motor of the invention, an outer winding of a concentric main winding is inserted in the large slot.

Moreover, in the single-phase motor of the invention, in case of inserting windings, the main winding is inserted after the auxiliary winding is inserted to the slot.

Yet further, according to the present invention, in a single-phase motor having: a stator including a stator iron core formed by laminating a plurality of electromagnetic steel sheets and provided with a slot between stator teeth, and single-phase two-pole distributed windings composed of a main winding and an auxiliary winding contained in the slot; and a rotor placed through a gap on an inner circumference of the stator, a notch having an approximately same width as the stator teeth on an outer circumference of the stator iron core.

According to the present invention, a hermetic compressor includes the above single-phase motor.

EFFECT OF THE INVENTION

According to the present invention, it is possible to obtain a highly efficient and low-cost single-phase motor formed by the above structure by producing a motor in a form that allows a proper material layout, with securing a magnetic path of a coreback of a stator iron core.

PREFERRED EMBODIMENT FOR CARRYING OUT THE INVENTION

Embodiment 1

FIGS. 1 through 6 show the first embodiment. FIG. 1 is a cross sectional view showing a stator iron core of a single-phase motor. FIG. 2 is an explanatory drawing of a method for blanking the stator iron core. FIG. 3 is a cross sectional view showing the stator iron core of the single-phase motor. FIG. 4 is a cross sectional view showing the stator iron core when it is used for an induction motor. FIG. 5 is a cross sectional view showing the stator iron core when it is used for a synchronous induction motor. FIG. 6 is a cross sectional view showing stator iron core when it is used for a brushless DC (Direct Current) motor.

In FIG. 1, a stator iron core 1 is formed by laminating a plurality of electromagnetic steel sheets which is magnetic substance, and an outer circumference formed by the electromagnetic steel sheets has a roughly circular shape. The stator iron core 1 includes six notches 2 that are formed by providing with straight line portions at a form of the outer circumference, and the six notches are arranged so that four of the six notches form a rectangle. When the stator is inserted to a cylindrical frame (not illustrated), the notches 2 become empty.

The stator iron core 1 is provided with slots having different depths, that is, a small slot 3 and a large slot 4. Inside of the small slot 3 and the large slot 4, two-pole single-phase concentric windings composed of a main winding and an auxiliary winding are inserted. By passing electric current through the main winding and the auxiliary winding, two-pole rotating magnetic field is generated by the stator.

FIG. 2 is an explanatory drawing of material layout for the stator iron core 1 formed by blanking out of hoop material 6 of rolled electromagnetic steel sheets. As shown in FIG. 1, the notches 2 are provided so that, among the six notches, the straight line portions of the four notches make a rectangle as shown by a wavy line. When the four notches 2 of the outer circumference form a rectangle, two straight lines of the rectangle that face each other determine a horizontal width of necessary hoop material 6, and the other two straight lines determine each pitch (interval) which is necessary for blanking the stator iron core 1. By forming a rectangle, it is possible to reduce a horizontal width of the hoop material 6 and also reduce each pitch compared with a shape that does not form a rectangle. Namely, an area of the electromagnetic steel sheet necessary for blanking the stator iron core 1 can be reduced. By improving material layout (material yield), a low-cost single-phase motor can be obtained.

Further, the stator iron core 1 includes large and small slots, and some or all of slots, an outer circumferential side of which does not have the notch 2, are made large slots 4, and slots of the other parts are made small slots 3.

Due to the rotating magnetic field generated by the stator, magnetic flux density of a coreback 5, especially in two-pole rotating magnetic field, tends to be high. If the magnetic flux density becomes too high (saturated), not only iron loss at the coreback 5 increases, but copper loss also increases because electric current that flows through the main winding and the auxiliary winding necessary for generating torque is increased, which causes a problem that the efficiency is degraded.

In the present embodiment, a depth in a radial direction of slots, an outer circumferential side of which does not have the notch 2 is made large, and a depth of slots in the other part is made small, so that the length of coreback is secured so as not to make the magnetic flux density saturated. By moderating the magnetic flux density, the increase of iron loss and copper loss can be prevented, and a highly efficient single-phase motor can be obtained.

Here, a case of four notches 2 in total will be explained. A total area of the notches 2 is a necessary area for securing the reliability of the motor. In particular, when a single-phase motor is used for a hermetic compressor, since the notches 2 become a passage for refrigerant, the performance of the hermetic compressor is degraded if the total area of the notches 2 is reduced.

It is, needless to say, possible to form a rectangle by the four notches 2 in total, and further to improve material layout for blanking. However, when only four of the notches 2 are provided, each area of the notches 2 needs to be larger compared with a case of six notches. Because of this, a length of the coreback is reduced, and the magnetic flux density of the coreback becomes high. In order to obtain both features of moderation of the magnetic flux density of the coreback and a proper material layout, it is desired to form a rectangle (or a square) by six notches.

Further, when the number of notches is distributed, an area which contacts with the cylindrical frame is decreased, and the number of contacts is increased. Because of this, energy that transfers electromagnetic vibration generated by the stator is distributed, and a single-phase motor with low vibration and low noise can be obtained. In particular, in a two-pole single-phase motor, the magnetic field generated by the stator becomes an oval magnetic field that is distorted from the rotating magnetic field. Therefore, in the two-pole single-phase motor, since the electromagnetic vibration tends to increase, more effect can be achieved.

As shown in FIG. 3, by increasing the areas of notches at the left and right sides, the horizontal width of the hoop material shown in FIG. 2 can be further reduced, and thus it is possible to obtain a lower cost single-phase motor. However, when the notches 2 at the left and right sides are made too large, the magnetic path of the coreback 5 is interrupted, so that the efficiency may be degraded. In such a case, depending on necessity, the deterioration of efficiency can be prevented by forming small slots 31 so as to reduce the area of slots which face the notches 2 at the left and right sides.

FIG. 4 is a cross sectional view showing the stator of the single-phase motor when it is used for an induction motor. In FIG. 4, a rotor iron core 7 of a rotor has a rotor slot 8 to which conductive material such as aluminum or copper is cast in. When the stator of the single-phase motor of the present embodiment is used for the induction motor, by moderating the magnetic flux density of the coreback as discussed above, it is possible to reduce the electric current that runs through the main winding and the auxiliary winding at the same torque. Therefore, when the single-phase motor of the present embodiment is used for the induction motor, a highly efficient single-phase motor can be obtained.

Further, FIG. 5 is a cross sectional view showing the stator of the single-phase motor when it is used for a synchronous induction motor. In FIG. 5, the rotor iron core 7 of the rotor has a rotor slot 8 and a rotor slit 9 to which conductive material such as aluminum or copper is cast in. Here, a case will be explained, in which aluminum is cast in both the rotor slot 8 and the rotor slit 9; however, the same effect can be obtained even if the rotor slit 9 contains no conductive material.

Since a synchronous induction motor, at the time of normal operation, rotates synchronously to the rotating magnetic field generated by the stator, the magnetic flux density of the coreback tends to increase more than the induction motor. By employing the stator of the present embodiment in the synchronous induction motor, it is possible to reduce the magnetic flux density of the coreback, so that a further highly efficient single-phase synchronous induction motor can be obtained.

Further, FIG. 6 is a cross sectional view showing the stator of the single-phase motor when it is used for a brushless DC motor. In FIG. 6, the rotor includes a rare earth magnet 13. When the rare earth magnet 13 is used, the magnetic flux generated by the rotor becomes very strong, so that the magnetic flux density of the coreback 5 tends to increase further. However, it is possible to obtain a highly efficient brushless DC motor by employing the stator of the present embodiment.

Moreover, when this single-phase motor is mounted on a hermetic compressor, since the mounted motor costs low and is highly efficient, it is possible to obtain a low cost and highly efficient hermetic compressor. If such a hermetic compressor is used for an air conditioner, energy saving can be accomplished.

In this embodiment, a case in which four notches form a rectangle has been discussed; however, the same effect can be obtained if they form a square. Further, the number of notches is not limited to that of this example but at least five.

Embodiment 2

FIG. 7 shows the second embodiment and is a horizontal cross sectional view of a stator of a single-phase motor. It is a cross sectional view of the stator iron core 1 shown in the first embodiment to which the main winding 10 and the auxiliary winding 11 of single-phase two-pole concentric windings are inserted.

In FIG. 7, only the main winding 10 is inserted in the large slot 4, and among the small slots 3, there are slots to which only the auxiliary winding 11 is inserted and slots to which both the main winding 10 and the auxiliary winding 11 are distributed and inserted. Therefore, to the large slot, an outer winding of the concentric main winding is inserted.

Here, the windings are inserted so that the quantity of copper of the main winding 10 inserted in the large slot 4 should be increased, and at the same time an occupying rate of winding (a rate of cross section area of winding occupied in a slot area) should be made higher than the occupying rate of winding of the small slots 3.

In the vicinity of an edge in an axial direction of the large slot 4 to which the main winding 10 is inserted, a coil end of the auxiliary winding 11 passes. However, the coil end of the auxiliary winding 11 can be easily extended to the outside, so that the occupying rate of winding of the large slot 4 can be increased.

In a two-pole single-phase motor, main winding copper loss at the main winding 10 is often increased more than auxiliary winding copper loss which is a loss at the auxiliary winding 11. In the present embodiment, since the occupying rate of winding of the main winding 10 inserted to the large slot 4 is made higher, it is possible to reduce a coil resistance of the main winding 10 compared with a case where the occupying rate of winding is the same between the large slot 4 and the small slot 3. When the coil resistance is reduced, the main winding copper loss can be reduced in the same electric current, and the stator of a highly efficient single-phase motor can be obtained.

Further, by reducing the coil resistance of the main winding, it is possible to increase the possibly maximum torque (stalling torque) to be generated at the same voltage. Namely, when expressed inversely, it is possible to generate operable torque even if the applied voltage is decreased in a circumstance of degraded power source, which enables to obtain the stator of a highly reliable single-phase motor.

Moreover, in FIG. 7, the windings are formed by inserting the main winding 10 after inserting the auxiliary winding 11, so that the auxiliary winding 11 is placed at an outer circumferential side of the slot and the main winding 10 is placed at an inner circumferential side of the slot. A coil length of the main winding 10 placed at the inner circumferential side can be made shorter than one of the auxiliary winding 11 placed at the outer circumferential side. Since the coil resistance of the main winding can be reduced more by shortening the coil length, it is possible to obtain the stator of a further highly efficient and highly reliable single-phase motor.

Embodiment 3

FIG. 8 shows the third embodiment and is a horizontal cross sectional view showing a stator of a single-phase motor. As shown in the figure, roughly semicircular notches 2 are provided on an outer circumference of the stator iron core 1.

When the stator is mounted on a hermetic compressor, the notches 2 are used as passages for refrigerant or oil, etc., and in order to secure the performance and reliability, it is necessary to form the notches 2 to have a total area of more than a certain level. By increasing the number of the notches 2, the total area can be secured even if each area of the notches 2 is small.

Further, the notches 2 are formed to have almost the same width as width of stator teeth 12 and are provided on the outer circumference of the stator teeth 12. The width of the coreback 5 is the smallest at the outer circumferential side of the slots, and since the width of the outer circumferential side of the stator teeth 12 is large, the magnetic flux density does not become high at this portion. When the roughly semicircular notches 2 are provided at the portion where the magnetic flux density does not become high, the magnetic flux is not saturated, and the increase of electric current which flows through the windings can be prevented.

Further, by increasing the number of the notches 2, it is possible to secure sufficient width of the coreback, and the stator of a highly efficient single-phase motor can be obtained with reducing the magnet flux density.

Further, FIG. 9 is a horizontal cross sectional view of a stator of another single-phase motor. FIG. 9 is made by increasing the depth of the notches 2 with fixing the width of the coreback of FIG. 8. If the area of the notches 2 is insufficient, it is applicable by increasing the depth of the notches 2 in the radial direction.

Further, FIG. 10 is an explanatory drawing showing a stator of a single-phase motor which includes a single-phase two-pole main winding 10 and an auxiliary winding 11. In FIG. 10, notches are not provided on the outer circumferential side of the slots to which the main winding is inserted.

As described above, by increasing an area of the slots which contain the main winding 10, it is possible to obtain a highly efficient and highly reliable single-phase motor. Also in this embodiment, similar effect can be obtained by considering both the positions of notches and the arrangement of windings of the slots. In FIG. 10, large and small slots are not formed; however, further effect can be achieved by making the slots to which the main winding 10 is inserted large as discussed above.

Embodiment 4

FIG. 11 shows the fourth embodiment and is a vertical cross sectional view of a hermetic compressor. The hermetic compressor of FIG. 11 is a rotary compressor; however, the embodiment can be applied to other kinds of compressor. As shown in FIG. 11, the hermetic compressor includes a compressor element part 21 and a motor element part 20 that drive the compressor element part 21 through a rotation shaft 23 in a sealed container 22. The single-phase motor according to the first through third embodiments is used for the motor element part 20.

When the single-phase motor according to the fist through third embodiments is mounted on the hermetic compressor, since the mounted motor costs low and is highly efficient, it is possible to obtain a low-cost and highly efficient hermetic compressor. If the hermetic compressor is used for an air conditioner, energy saving can be achieved.

EXPLANATION OF SIGNS

Figure 1:
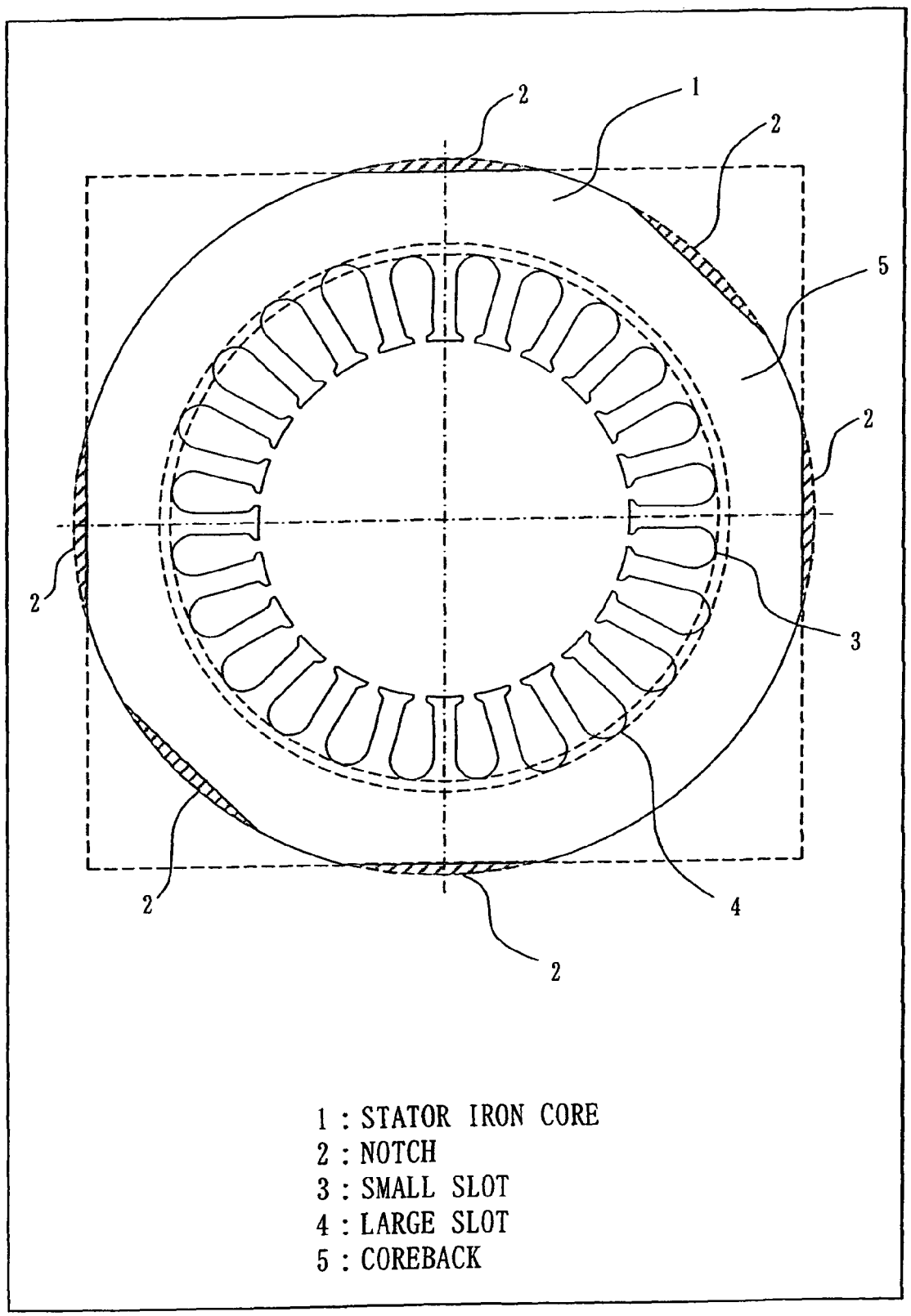
FIG. 1 shows the first embodiment and is a cross sectional view showing a stator iron core of a single-phase motor.
Figure 2:
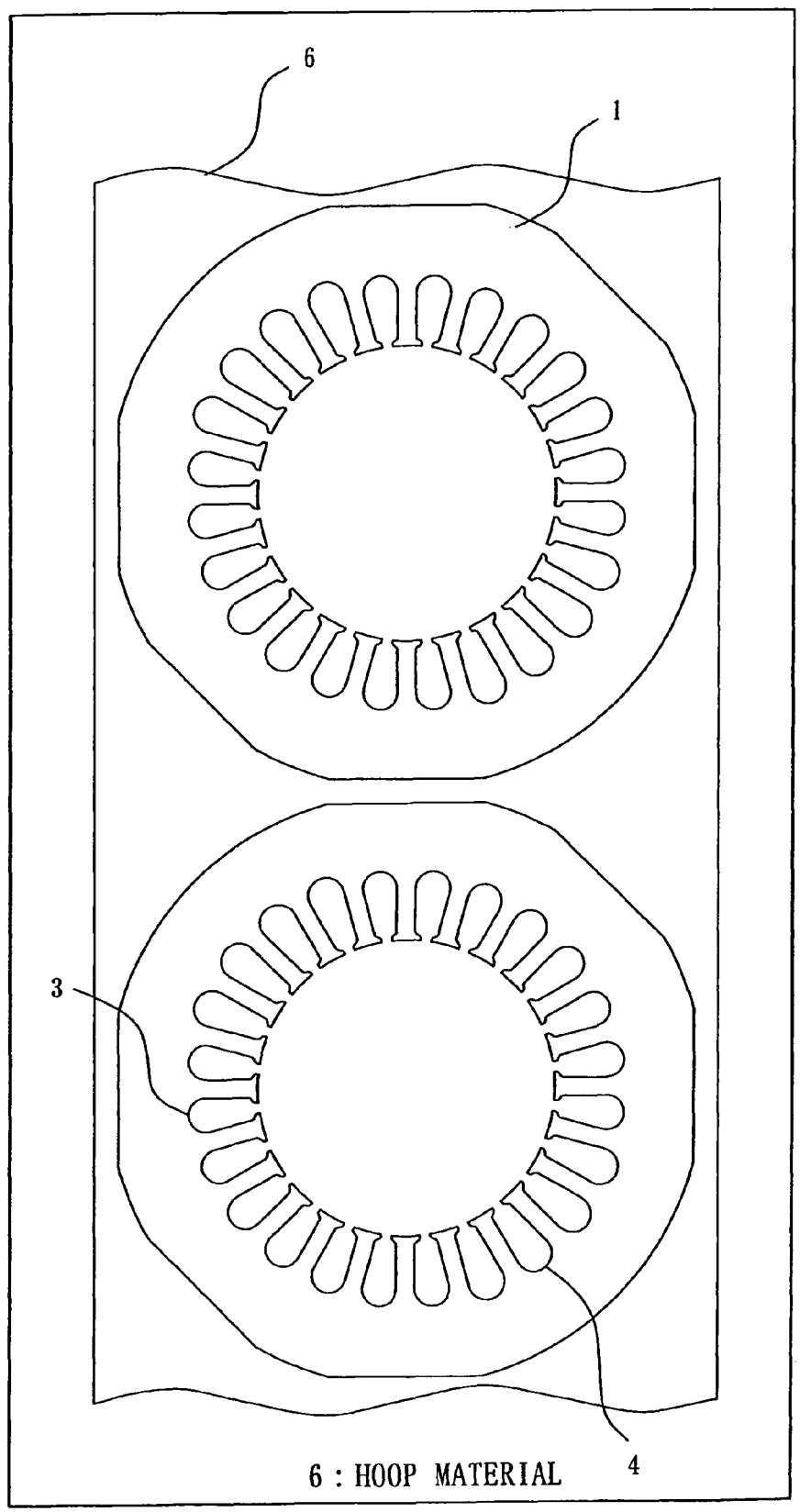
FIG. 2 shows the first embodiment and is an explanatory drawing of a method for blanking the stator iron core.
Figure 3:
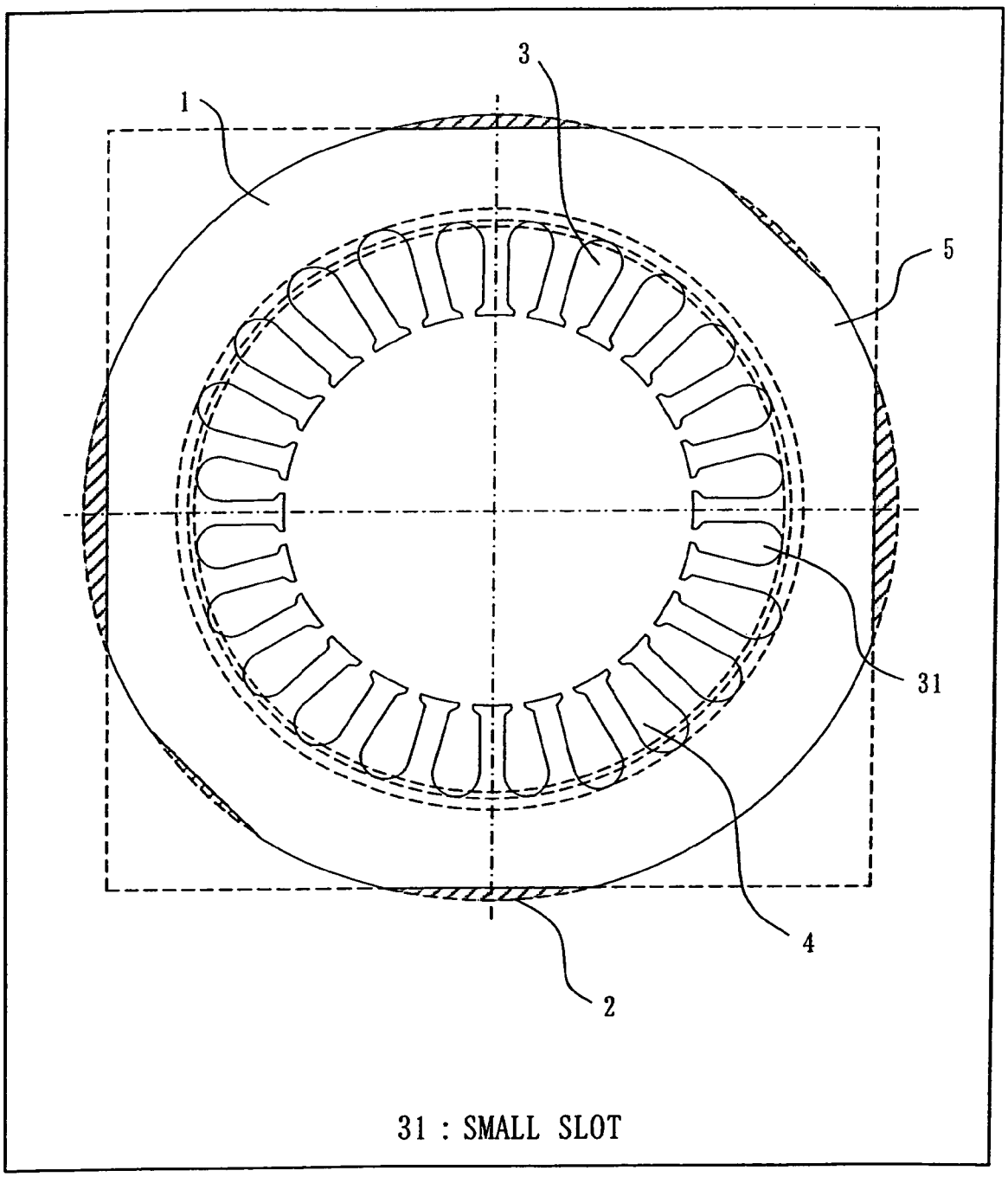
FIG. 3 shows the first embodiment and is a cross sectional view showing the stator iron core of the single-phase motor.
Figure 4:
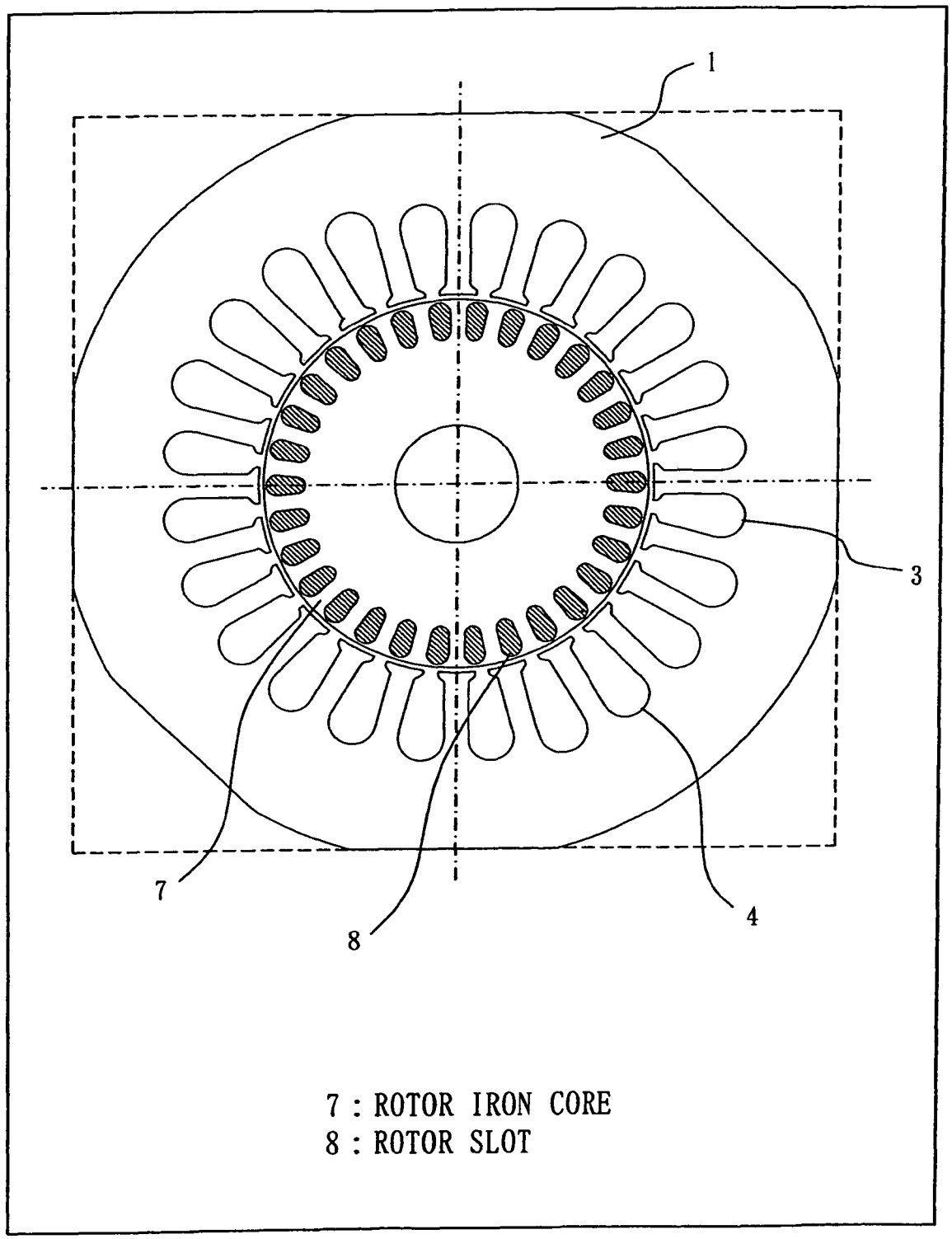
FIG. 4 shows the first embodiment and is a cross sectional view showing the stator iron core when it is used for an induction motor.
Figure 5:
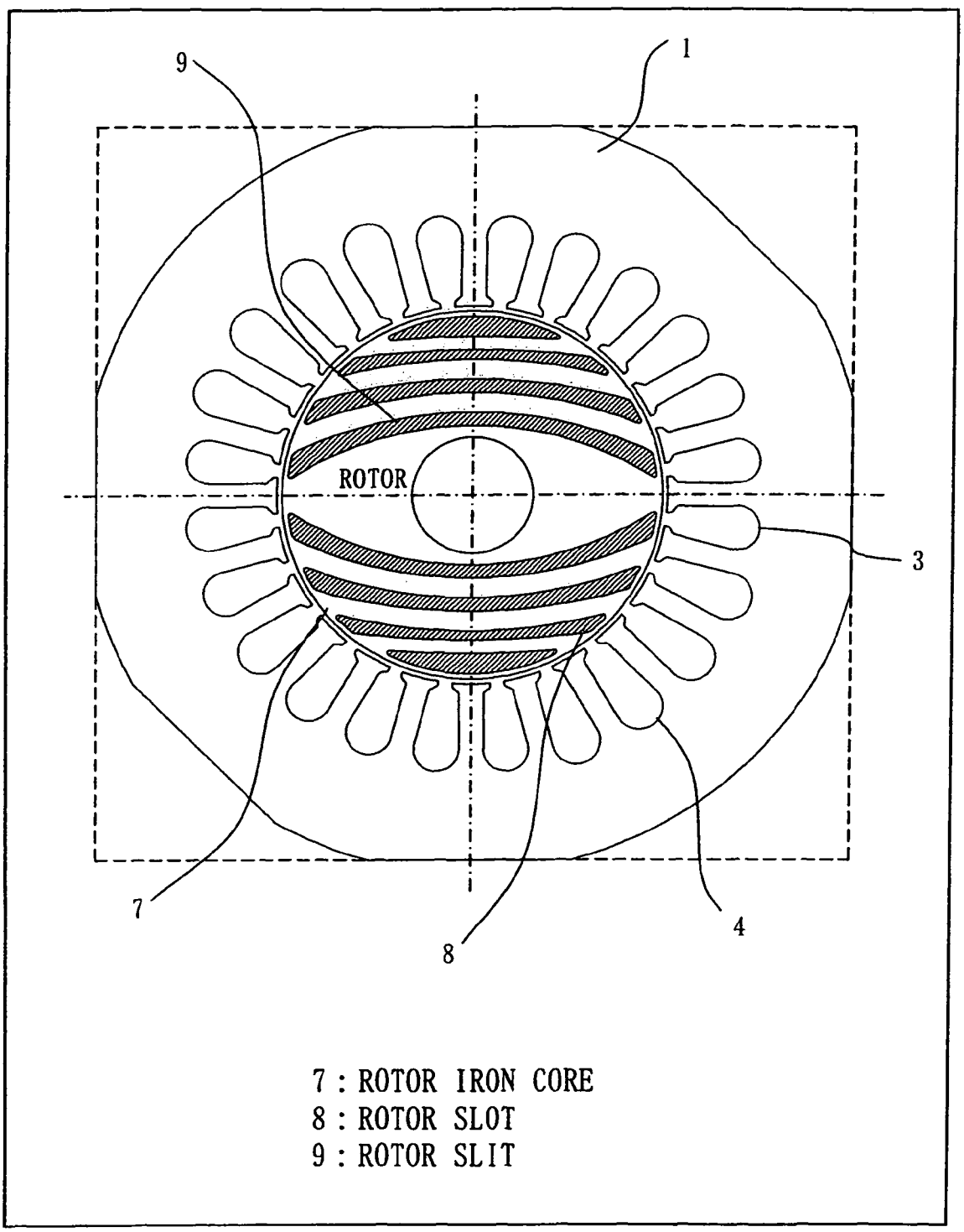
FIG. 5 shows the first embodiment and is a cross sectional view showing the stator iron core when it is used for a synchronous induction motor.
Figure 6:
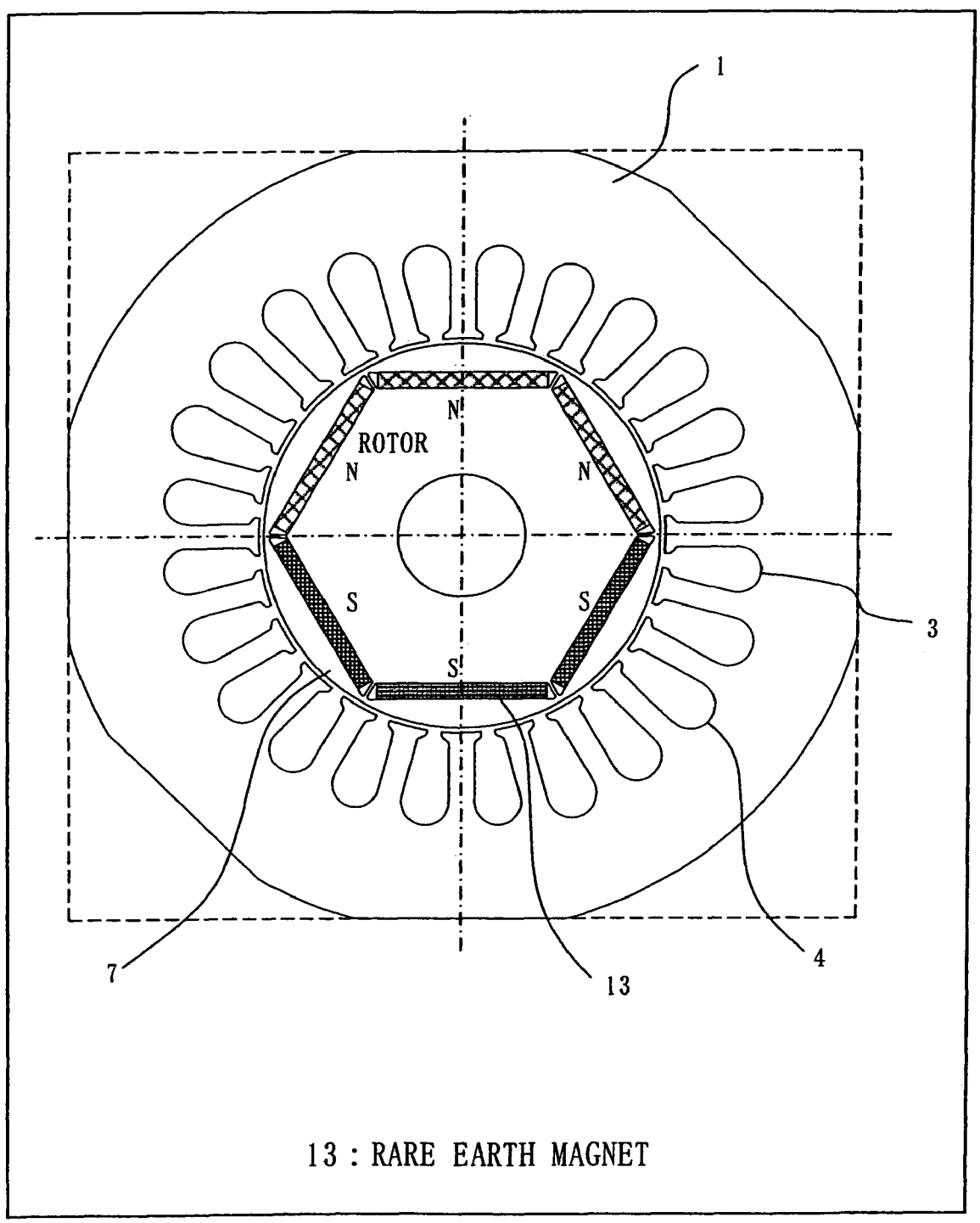
FIG. 6 shows the first embodiment and is a cross sectional view showing the stator iron core when it is used for a brushless DC motor.
Figure 7:
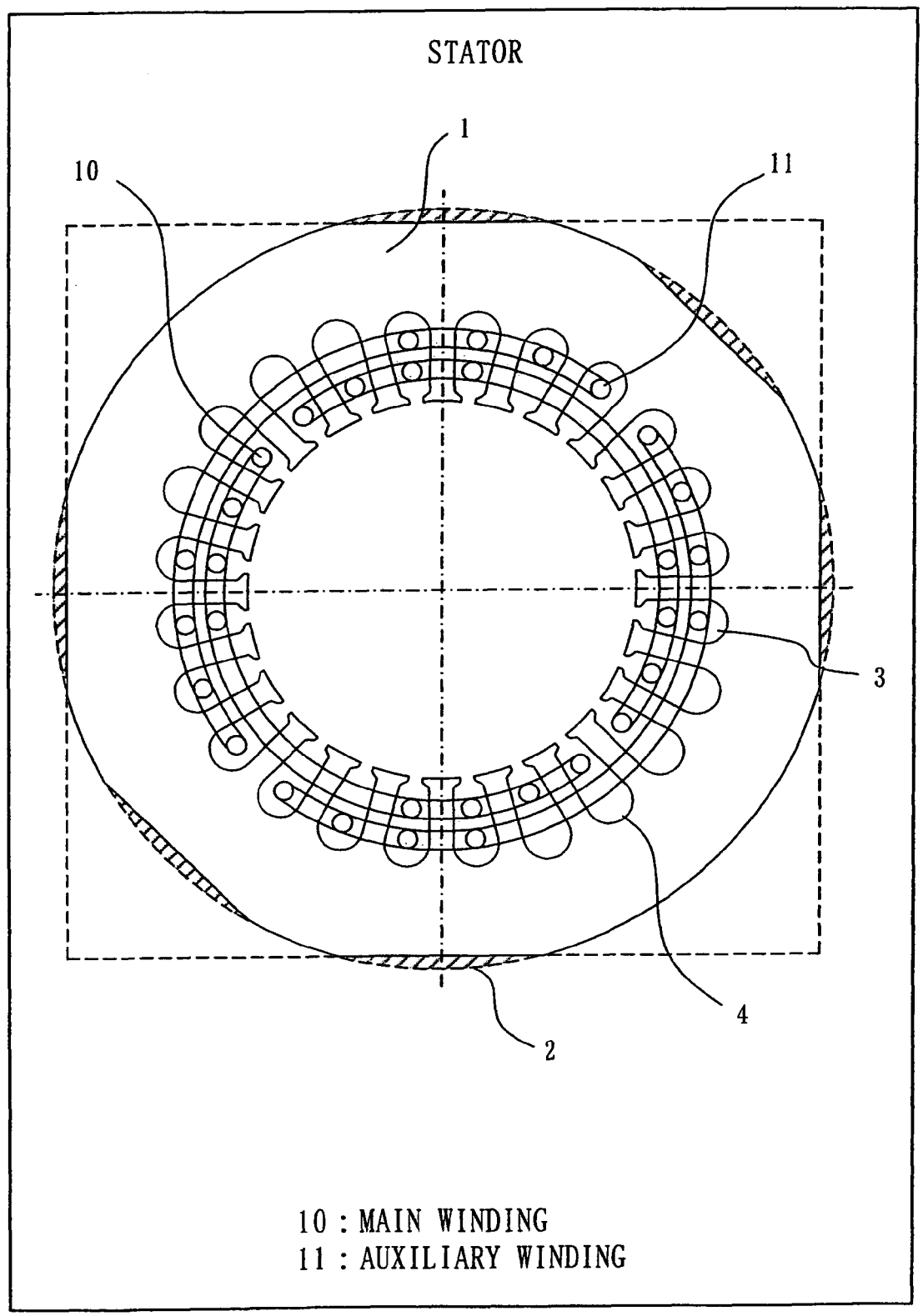
FIG. 7 shows the second embodiment and is a cross sectional view showing a stator of a single-phase motor.
Figure 8:
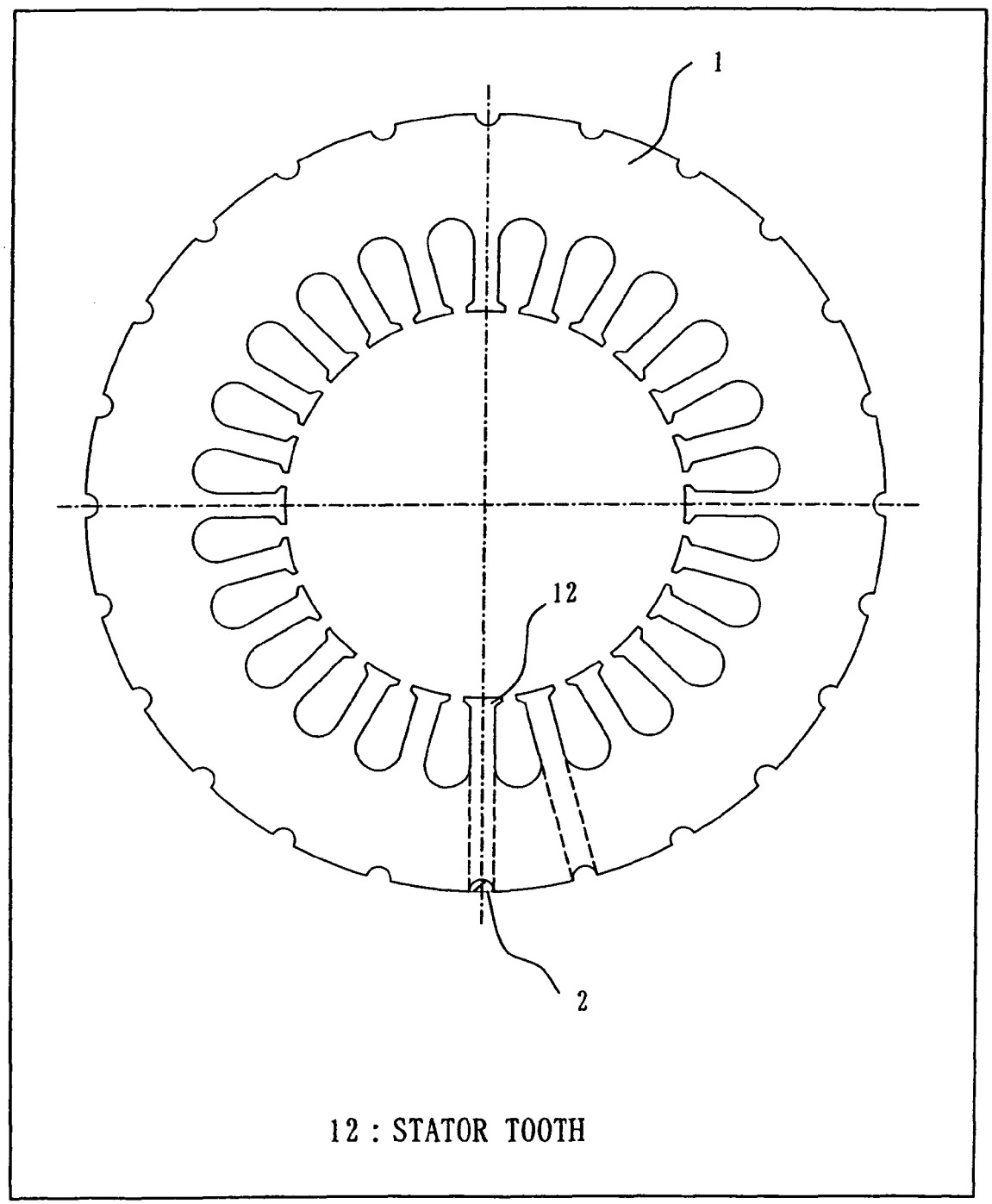
FIG. 8 shows the third embodiment and is a cross sectional view showing a stator iron core of a single-phase motor.
Figure 9:
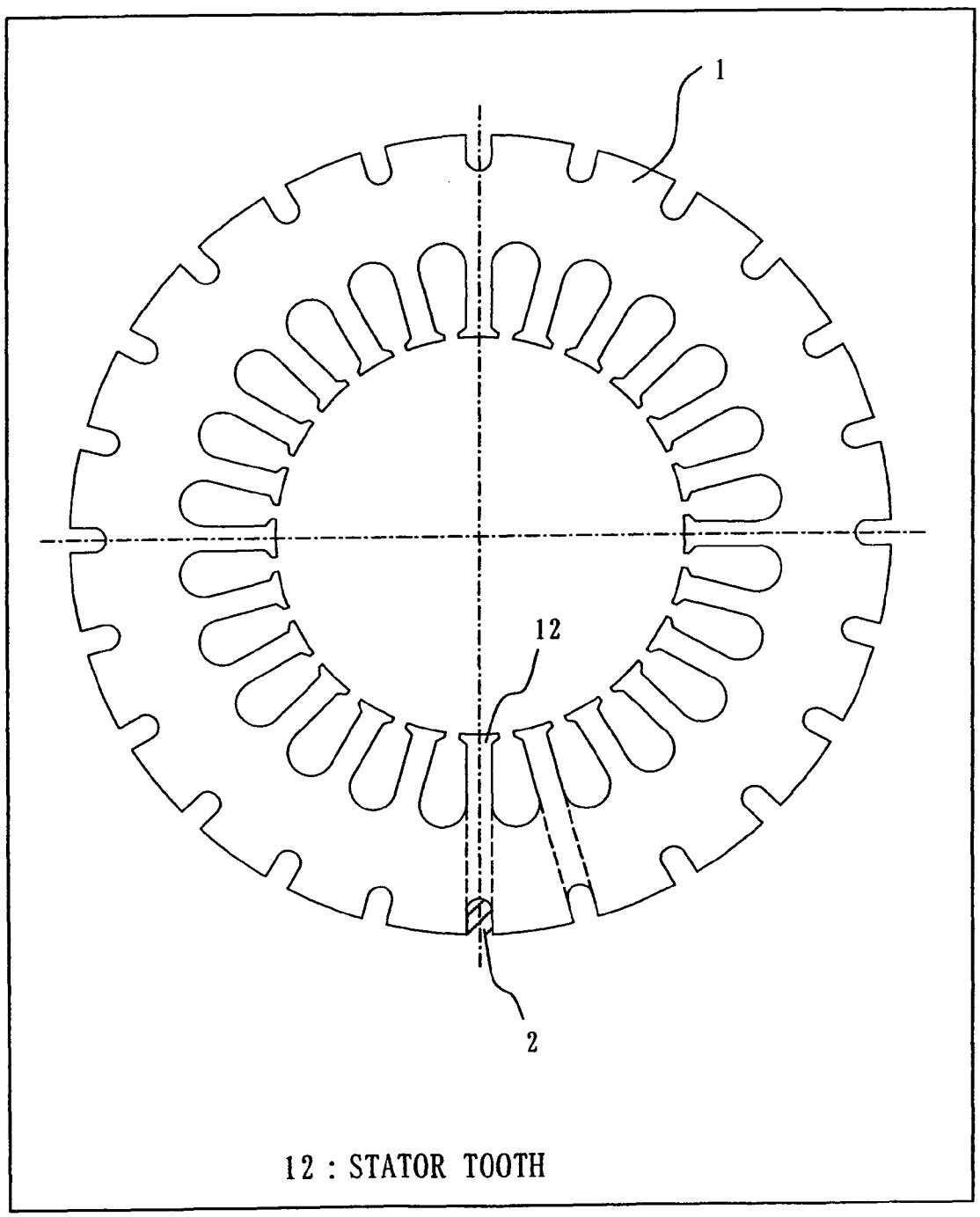
FIG. 9 shows the third embodiment and is a cross sectional view showing a stator iron core of a single-phase motor.
Figure 10:
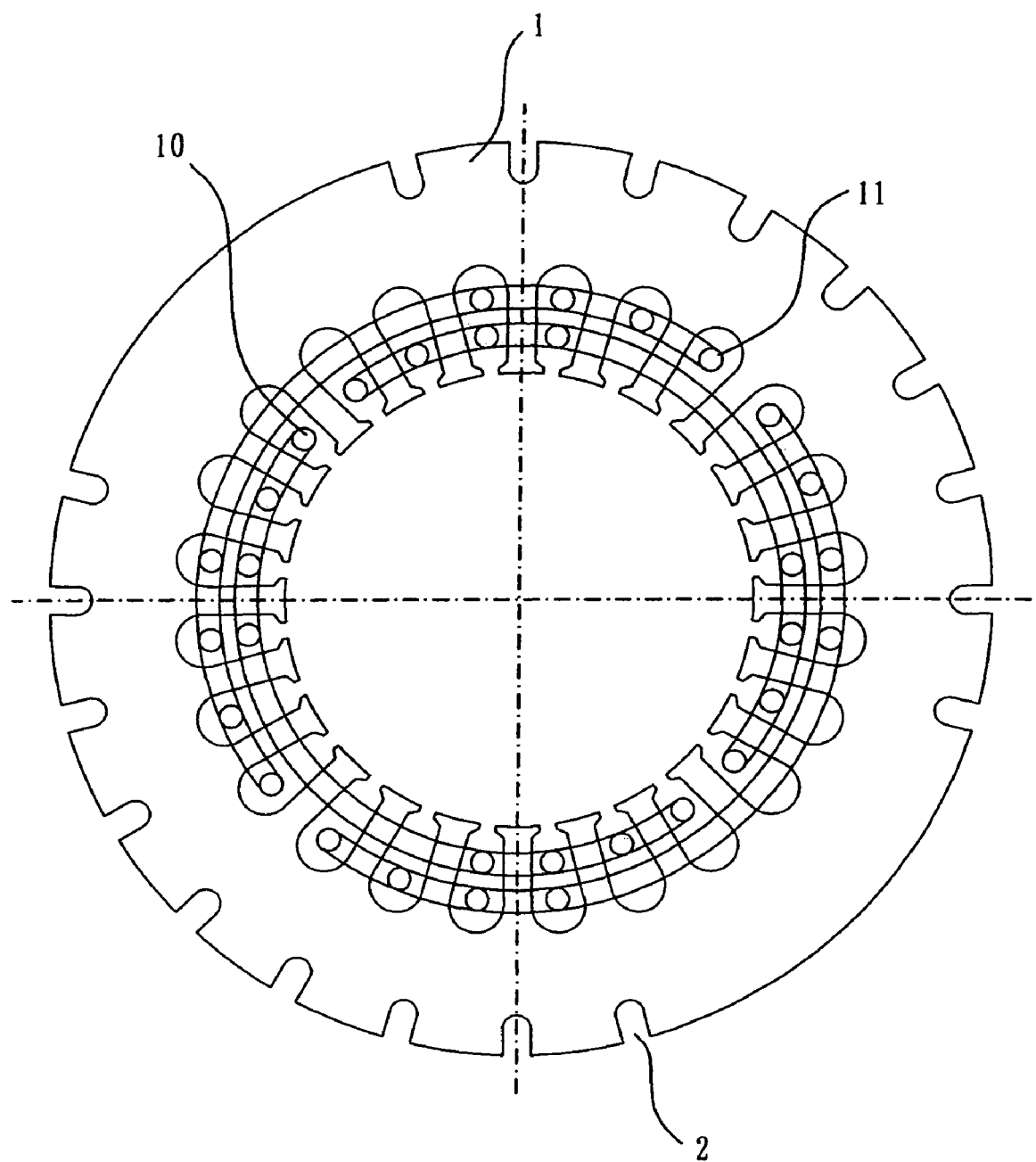
FIG. 10 shows the third embodiment and is a cross sectional view showing a stator iron core of a single-phase motor.
Figure 11:
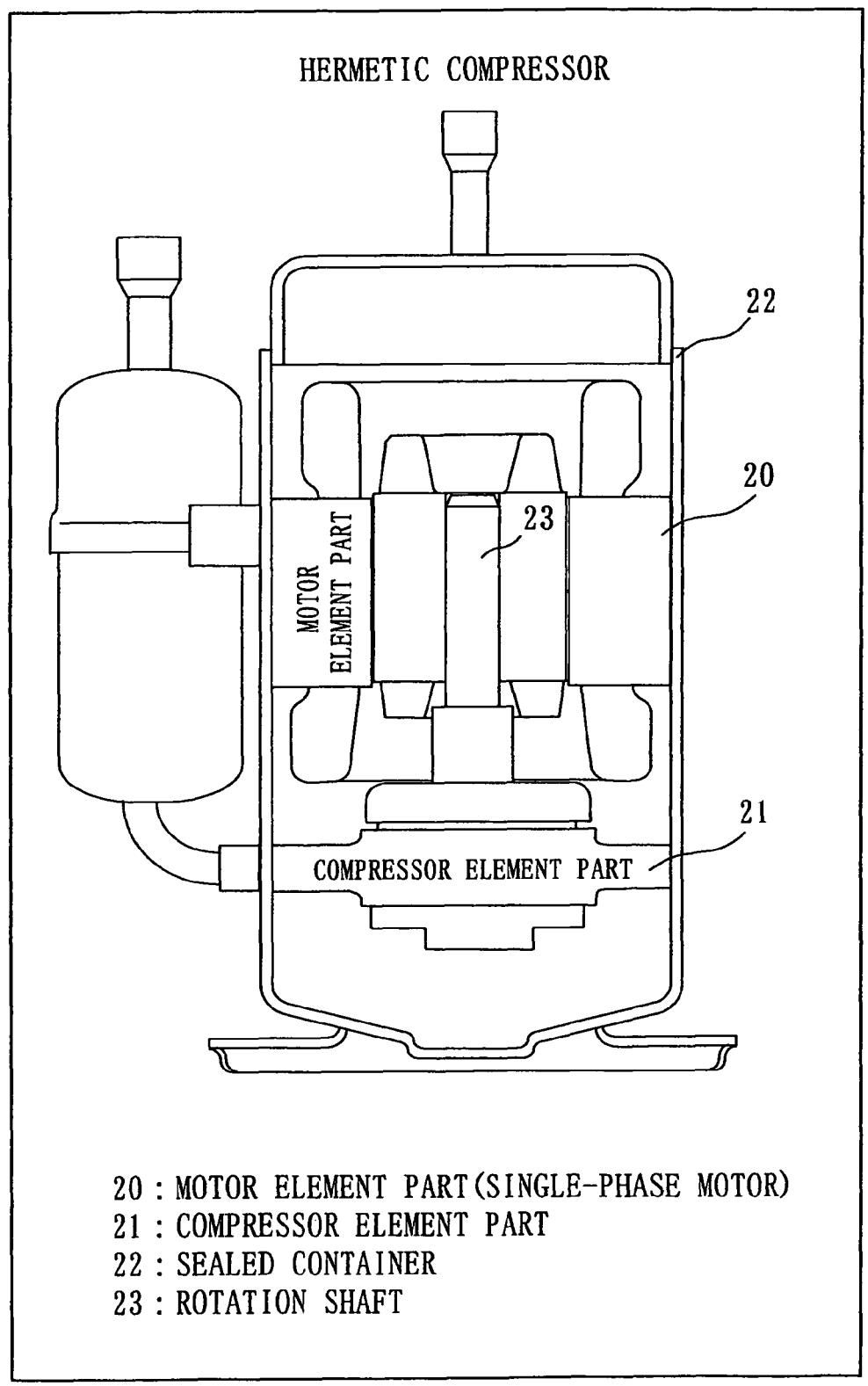
FIG. 11 shows the fourth embodiment and is a cross sectional view showing a hermetic compressor.

1: a stator iron core; 2: a notch; 3, 31: a small slot; 4: a large slot; 5: a coreback; 6: hoop material; 7: a rotor iron core; 8: a rotor slot; 9: a rotor slit; 10: a main winding; 11: an auxiliary winding; 12: a stator tooth; 13: a rare earth magnet; 20: a motor-element part; 21: a compressor element part; 22: a sealed container; and 23: a rotation shaft.

The invention claimed is:

1. A single-phase motor comprising:
 a stator including a stator iron core formed by laminating a plurality of electromagnetic steel sheets and provided with a plurality of slots, each of which is arranged between each of a plurality of stator teeth, and
 single-phase two-pole distributed windings composed of a main winding and an auxiliary winding contained in respective slots;
 a rotor placed through a gap on an inner circumference of the stator; and
 a plurality of notches having an approximately same width as the stator teeth on an outer circumference of the stator iron core,
 wherein a notch is not provided at an outer circumferential side of a slot in which the main winding is inserted among the plurality of slots.

2. A hermetic compressor comprising the single-phase motor of claim 1.

3. The single phase motor of claim 1, wherein each semicircular notch is aligned with a respective stator tooth so that their centers are substantially located on the same radial axis.

4. The single phase motor of claim 1, wherein in the assembled state of the single phase motor, each of the plurality of evenly spaced semicircular notches form a flow passage.

5. The single-phase motor of claim 1, wherein the plurality of slots includes large slots and small slots, the large slots being larger than the small slots and wherein the main winding is inserted in a large slot.

6. The single-phase motor of claim 1, wherein the main winding is inserted into a respective slot after the auxiliary winding is inserted into a respective slot.

7. The single-phase motor of claim 5, wherein an outer winding of the main winding of a concentric winding system is inserted in a large slot.

* * * * *